US012772031B2

(12) United States Patent
Grodin et al.

(10) Patent No.: US 12,772,031 B2
(45) Date of Patent: *Oct. 20, 2026

(54) METHOD AND SYSTEM FOR ASSISTED NON-TERRESTRIAL NETWORK SELECTION AND ACCESS

(71) Applicant: Verizon Patent and Licensing Inc., Basking Ridge, NJ (US)

(72) Inventors: Andrew M. Grodin, Livingston, NJ (US); Lily Zhu, Parsippany, NJ (US); Andrew E. Youtz, Princeton, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 421 days.

This patent is subject to a terminal disclaimer.

(21) Appl. No.: 18/194,033

(22) Filed: Mar. 31, 2023

(65) Prior Publication Data

US 2024/0259774 A1 Aug. 1, 2024

Related U.S. Application Data

(63) Continuation-in-part of application No. 18/162,906, filed on Feb. 1, 2023.

(51) Int. Cl.

*H04W 8/00* (2009.01)
*H04W 76/10* (2018.01)
*H04W 84/06* (2009.01)

(52) U.S. Cl.

CPC .......... *H04W 8/005* (2013.01); *H04W 76/10* (2018.02); *H04W 84/06* (2013.01)

(58) Field of Classification Search

CPC ...... H04W 8/005; H04W 76/10; H04W 84/06
USPC .......................................................... 370/329
See application file for complete search history.

(56) References Cited

U.S. PATENT DOCUMENTS

| | | | | |
|---|---|---|---|---|
| 6,901,276 | B1 | 5/2005 | Skinner | |
| 12,058,582 | B2 | 8/2024 | Chen | |
| 2010/0054205 | A1 | 3/2010 | Kalhan | |
| 2015/0247928 | A1* | 9/2015 | Waters | G01S 19/35 342/357.4 |
| 2019/0007894 | A1 | 1/2019 | Subramanian | |
| 2021/0068013 | A1 | 3/2021 | Cheng | |
| 2023/0066232 | A1* | 3/2023 | Caro | G06F 1/163 |
| 2023/0254803 | A1* | 8/2023 | Lu | H04W 48/16 455/435.1 |
| 2024/0236820 | A1 | 7/2024 | Sugiyama | |
| 2025/0024282 | A1 | 1/2025 | Kim | |
| 2025/0063532 | A1* | 2/2025 | Ko | H04W 64/00 |

* cited by examiner

*Primary Examiner* — Hermon Asres

(57) ABSTRACT

A method, a device, and a non-transitory computer-readable storage medium are described in relation to an assisted non-terrestrial network selection and access service. The assisted non-terrestrial network selection and access service include providing non-terrestrial network assistance information to end devices. The end devices may use the non-terrestrial network assistance information to perform searching, accessing, and connecting to non-terrestrial networks. The end devices may provide feedback information regarding the validity or invalidity of the non-terrestrial network assistance information after searches and connection procedures are performed.

20 Claims, 8 Drawing Sheets

METHOD AND SYSTEM FOR ASSISTED NON-TERRESTRIAL NETWORK SELECTION AND ACCESS

REFERENCE TO RELATED APPLICATION

This patent application is a continuation-in-part of U.S. patent application Ser. No. 18/162,906, entitled "METHOD AND SYSTEM FOR TERRESTRIAL AND NON-TERRESTRIAL NETWORKS SELECTION" and filed on Feb. 1, 2023, which is incorporated herein by reference in its entirety.

BACKGROUND

Development and design of networks present certain challenges from a network-side perspective and an end device perspective. For example, Next Generation (NG) wireless networks, such as Fifth Generation New Radio (5G NR) networks are being deployed and are under development. The establishment and maintenance of wireless connectivity between the end device and a wireless network remains an ongoing issue.

DETAILED DESCRIPTION

Figure 1:
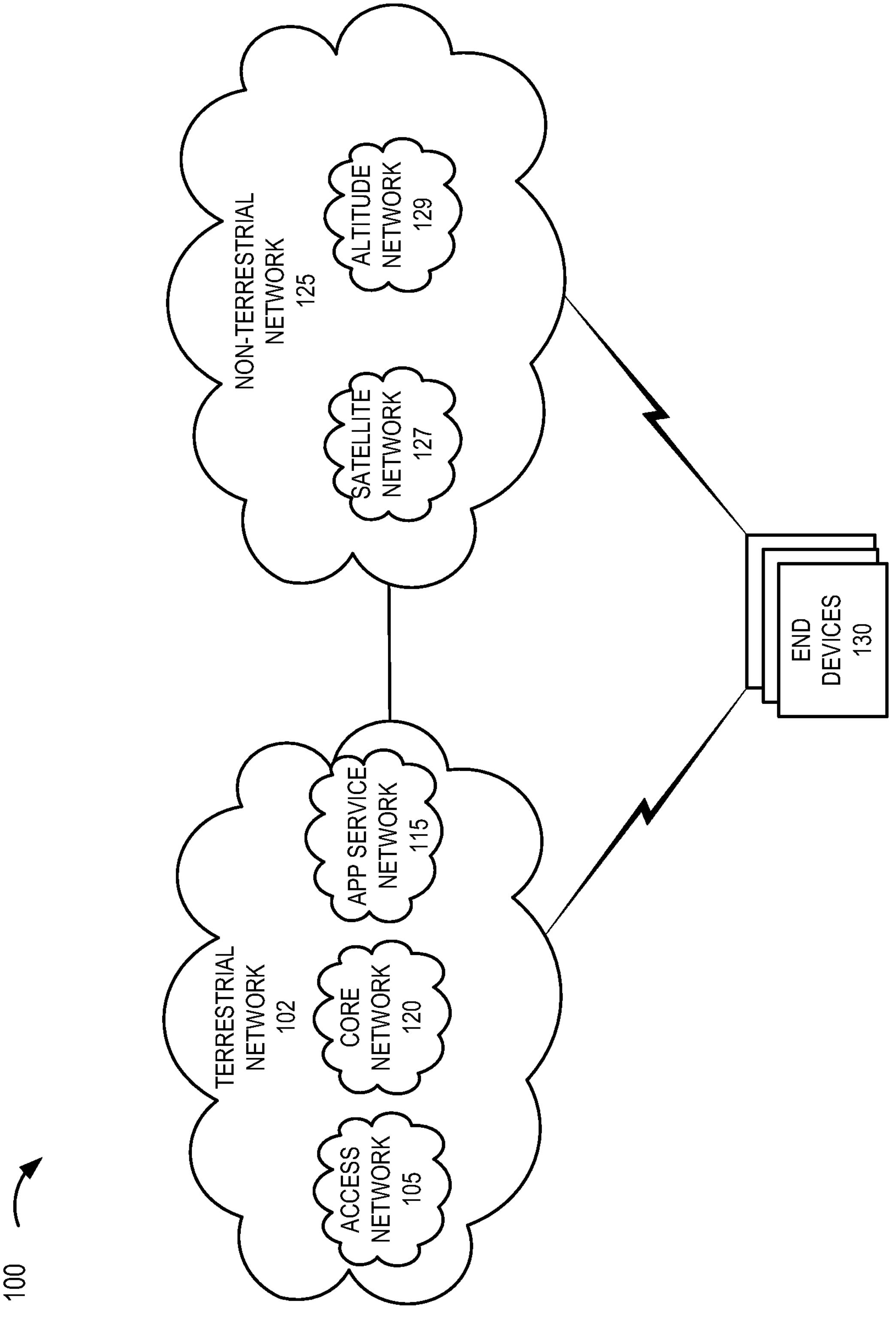
FIG. 1 is a diagram illustrating an exemplary environment in which an exemplary embodiment of an assisted non-terrestrial network selection and access service may be implemented.

The following detailed description refers to the accompanying drawings. The same reference numbers in different drawings may identify the same or similar elements. Also, the following detailed description does not limit the invention.

Satellite direct to device communication has become popular in recent years. A satellite network is typically inferior to a cellular network due to its limited performance and available bandwidth, for example. By way of further example, there are performance challenges related to a non-terrestrial network (NTN), such as a satellite network, pertaining to management of distance, speed, and mobility of both the satellite and the end device. Additionally, for example, reliability, stability, propagation delay, throughput, bandwidth, and other metrics may impact end device connectivity and quality of service for application service sessions. However, the satellite network may supplement wireless service when a terrestrial network (TN), such as the cellular network is not available. Depending on the scenario, the coverage areas associated with the satellite network and the cellular network may or may not overlap.

Aside from performance-related trade-offs that may pertain to end device connectivity with a TN versus an NTN, there also may be trade-offs involved in the performance of an NTN search versus a TN search and/or establishing access and connectivity with the NTN versus with the TN. For example, the performance of the NTN search by the end device may be more resource utilization intensive (e.g., processor, etc., of the end device) and/or may be more taxing on battery usage or power utilization relative to the TN search. Additionally, or alternatively, an NTN access and establishment of a connection with the NTN (e.g., an uplink connection, a downlink connection, synchronization, etc.) may be more resource utilization intensive and/or may be more taxing on battery usage or power utilization relative to a TN-based access and connectivity procedure. For example, depending on the type of NTN and/or sub-type of NTN (e.g., satellite versus non-satellite, stationary versus moving, etc.), the radio frequency (RF) bands to search and scan (e.g., a mobile satellite service (MSS) band, a cellular band, etc.), availability of a satellite link, and/or other variables (e.g., a proprietary NTN versus a standard compliant NTN), such procedures or operations mentioned above may impact the end device differently. Also, many of these factors if not all may be even more severe when the end device attempts a blind search for an NTN. Accordingly, there is a need to enable intelligent selection and use of cellular and satellite networks by the end device.

According to exemplary embodiments, an assisted non-terrestrial network selection and access service is described. According to an exemplary embodiment, the terrestrial network may be implemented to include a wireless network, such as a cellular network, a mobile network, a radio access network (RAN), or a non-cellular network, for example. According to an exemplary embodiment, the non-terrestrial network may be implemented as a satellite network or a type of air-based network (e.g., a high altitude platform system (HAPS), air-to-ground, etc.), for example. The non-terrestrial network may be of a proprietary and/or standard compliant (e.g., Third Generation Partnership Project (3GPP), 3GPP2, International Telecommunication Union (ITU), European Telecommunications Standards Institute (ETSI), Global System for Mobile (GSM) Association (GSMA), and the like) nature. According to an exemplary embodiment, an end device includes the assisted non-terrestrial network selection and access service, as described herein.

According to an exemplary embodiment, the assisted non-terrestrial network selection and access service may include configurable criteria that may cause or trigger the end device to search or scan for a non-terrestrial network. According to various exemplary embodiments, the criteria may relate to an automatic operation or a non-automatic operation (e.g., involve manual intervention by a user of the end device). For example, the criteria may include when terrestrial network service is not available. For example, the end device may unsuccessfully search and scan for cellular service. According to another example, the criteria may include when the end device may be barred from terrestrial network connectivity. According to yet another example, the criteria may include when attempts for terrestrial network connectivity result in repeated failures. According to still another example, the criteria may include that the user may trigger a search or scan for a non-terrestrial network when any of the above-mentioned situations exists.

According to an exemplary embodiment, the assisted non-terrestrial network selection and access service may provide to the end device NTN assistance information. For example, an application service network device, such as a server device may collect, store, and/or update information about an NTN device, an NTN, or both. According to an exemplary embodiment, the NTN assistance information may include location information (e.g., latitude, longitude, elevation, and azimuth angle) and associated time information (e.g., day, hour, minutes, seconds) pertaining to an NTN device, and channel information pertaining to the NTN device. According to an exemplary embodiment, the end device may obtain the NTN assistance information from the application service network device via push and/or pull communication methods.

According to an exemplary embodiment, when the end device is triggered to search or scan for a non-terrestrial network, the end device may use the NTN assistance information to perform the search or scan, and access (e.g., connection), as described herein. According to an exemplary embodiment, the end device may provide feedback information to the application service network device based on a result of the search, scan, and/or connectivity result. For example, when the end device is able to successfully connect to the NTN using the NTN assistance information, the end device may transmit a message that confirms the accuracy of the NTN assistance information. According to another example, when the end device is unable to connect to the NTN using the NTN assistance information, the end device may transmit a message that indicates the NTN assistance information is inaccurate. According to another example, when the end device is unable to connect to the NTN using the NTN assistance information but detects and may connect to an NTN using differing information relative to the NTN assistance information, the end device may transmit a message that includes the new information. For example, the end device may detect satellite coverage in an unexpected area, the end device may provide this information to the server device.

In view of the foregoing, the assisted non-terrestrial network selection and access service may facilitate the selection and access of non-terrestrial networks by an end device and support continuous end device connectivity with a network in an optimal manner. The assisted non-terrestrial network selection and access service may improve the access and use of application services by the end device, as described herein. The assisted non-terrestrial network selection and access service may eliminate the need of end devices performing blind searches and/or scans for non-terrestrial networks.

FIG. 1 is a diagram illustrating an exemplary environment 100 in which an exemplary embodiment of an assisted non-terrestrial network selection and access service may be implemented. As illustrated, environment 100 includes a terrestrial network 102 and a non-terrestrial network 125. Terrestrial network 102 may include an access network 105, an application ("app") service network 115, and a core network 120. Non-terrestrial network 125 may include a satellite network 127 and an altitude-based network 129. Environment 100 further includes end devices 130 (also referred to individually or generally as end device 130).

The number, type, and arrangement of networks illustrated in environment 100 are exemplary. For example, according to other exemplary embodiments, environment 100 may include fewer networks, additional networks, and/or different networks. For example, according to other exemplary embodiments, non-terrestrial network 125 may not include altitude-based network 129. Additionally, or alternatively, according to other exemplary embodiments, other networks not illustrated in FIG. 1 may be included, such as an X-haul network (e.g., backhaul, mid-haul, fronthaul, etc.), a transport network (e.g., Signaling System No. 7 (SS7), etc.), or another type of network that may support a wireless service and/or network access to an application service, as described herein.

A network device, a network element, or a network function (referred to herein simply as a network device) may be implemented according to one or multiple network architectures, such as a client device, a server device, a peer device, a proxy device, a cloud device, and/or a virtualized network device. Additionally, a network device may be implemented according to various computing architectures, such as centralized, distributed, cloud (e.g., elastic, public, private, etc.), edge, fog, and/or another type of computing architecture, and may be incorporated into distinct types of network architectures (e.g., Software Defined Networking (SDN), client/server, peer-to-peer, etc.) and/or implemented with various networking approaches (e.g., logical, virtualization, network slicing, etc.). Network devices may include non-virtual, logical, and/or physical network devices.

Environment 100 includes communication links between the networks and between the networks and end devices 130. Environment 100 may be implemented to include wired, optical, and/or wireless communication links. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number, type, and arrangement of communication links illustrated in environment 100 are exemplary.

Environment 100 may include various planes of communication including, for example, a control plane, a user plane, a service plane, and/or a network management plane. Environment 100 may include other types of planes of communication. A message communicated in support of the assisted non-terrestrial network selection and access service may use at least one of these planes of communication. According to various exemplary implementations, the interface of the network device and/or end device 130 may be a service-based interface, a reference point-based interface, an Open Radio Access Network (O-RAN) interface, a 5G interface, another generation of interface (e.g., 5.5G, Sixth Generation (6G), Seventh Generation (7G), etc.), a satellite interface, or some other type of communication interface.

Terrestrial network 102 may include one or multiple networks of one or multiple types and/or technologies that may be ground-based. Access network 105 may include one or multiple networks of one or multiple types and technologies. For example, access network 105 may be implemented to include a 5G RAN, a future generation RAN (e.g., a 6G RAN, a 7G RAN, or a subsequent generation RAN), a centralized-RAN (C-RAN), an O-RAN, and/or another type of access network. Access network 105 may include a legacy RAN (e.g., a Third Generation (3G) RAN, a Fourth Generation (4G) or 4.5 RAN, etc.). Access network 105 may communicate with and/or include other types of access networks, such as, for example, a Wi-Fi network, a Worldwide Interoperability for Microwave Access (WiMAX) network, a local area network (LAN), a Citizens Broadband Radio System (CBRS) network, a cloud RAN, an O-RAN network, a virtualized RAN (vRAN), a self-organizing network (SON), a wired network (e.g., optical, cable, etc.), or another type of network that provides access to or can be used as an on-ramp to access network 105.

Depending on the implementation, access network 105 may include one or multiple types of network devices, such as access devices (not illustrated). For example, the access devices may be implemented to include a next generation Node B (gNB), an evolved Long Term Evolution (eLTE) evolved Node B (eNB), an eNB, a radio network controller (RNC), a RAN intelligent controller (RIC), a remote radio head (RRH), a baseband unit (BBU), a radio unit (RU), a remote radio unit (RRU), a centralized unit (CU), a CU-control plane (CP), a CU-user plane (UP), a distributed unit (DU), a small cell node (e.g., a picocell device, a femtocell device, a microcell device, a home eNB, a home gNB, etc.), an open network device (e.g., O-RAN Centralized Unit (O-CU), O-RAN Distributed Unit (O-DU), O-RAN next generation Node B (O-gNB), O-RAN evolved Node B (O-eNB)), a 5G ultra-wide band (UWB) node, a future generation wireless access device (e.g., a 6G wireless station, a 7G wireless station, or another generation of wireless station), or another type of wireless node (e.g., a WiFi device, a WiMax device, a hotspot device, a fixed wireless access customer premise equipment (FWA CPE) that provides a wireless access service, or the like).

Application service network 115 may include one or multiple networks of one or multiple types and technologies that provides an application service. For example, application service network 115 may be implemented using one or multiple technologies including, for example, network function virtualization (NFV), software defined networking (SDN), cloud computing, Infrastructure-as-a-Service (IaaS), Platform-as-a-Service (PaaS), Software-as-a-Service (SaaS), or another type of network technology. Application service network 115 may be implemented to include a cloud network, a private network, a public network, a multi-access edge computing (MEC) network, a fog network, the Internet, a packet data network (PDN), a service provider network, the World Wide Web (WWW), an Internet Protocol Multimedia Subsystem (IMS) network, a Rich Communication Service (RCS) network, a software-defined (SD) network, a virtual network, a packet-switched network, a data center, a data network, or other type of application service layer network that may provide access to and may host an end device application service.

Depending on the implementation, application service network 115 may include various network devices such as external devices. For example, the external devices may include virtual network devices (e.g., virtualized network functions (VNFs), servers, host devices, application functions (AFs), application servers (ASs), server capability servers (SCSs), containers, hypervisors, virtual machines (VMs), network function virtualization infrastructure (NFVI), and/or other types of virtualization elements, layers, hardware resources, operating systems, engines, etc.) that may be associated with application services for use by end devices 130. By way of further example, external devices may include mass storage devices, data center devices, NFV devices, SDN devices, cloud computing devices, platforms, and other types of network devices pertaining to various network-related functions (e.g., security, management, charging, billing, authentication, authorization, policy enforcement, development, etc.). Although not illustrated, application service network 115 may include one or multiple types of core devices, as described herein.

The external devices may host one or multiple types of application services. For example, the application services may pertain to broadband services in dense areas (e.g., pervasive video, smart office, operator cloud services, video/photo sharing, etc.), broadband access everywhere (e.g., 50/100 Mbps, ultra-low-cost network, etc.), enhanced mobile broadband (eMBB), higher user mobility (e.g., high speed train, remote computing, moving hot spots, etc.), Internet of Things (e.g., smart wearables, sensors, mobile video surveillance, smart cities, connected home, etc.), extreme real-time communications (e.g., tactile Internet, augmented reality (AR), virtual reality (VR), etc.), lifeline communications (e.g., natural disaster, emergency response, etc.), ultra-reliable communications (e.g., automated traffic control and driving, collaborative robots, health-related services (e.g., monitoring, remote surgery, etc.), drone delivery, public safety, etc.), broadcast-like services, communication services (e.g., email, text (e.g., Short Messaging Service (SMS), Multimedia Messaging Service (MMS), etc.), massive machine-type communications (mMTC), voice, conferencing, instant messaging), video streaming, and/or other types of wireless and/or wired application services. The external devices may also include other types of network devices that support the operation of application service network 115 and the provisioning of application services, such as an orchestrator, an edge manager, an operations support system (OSS), a local domain name system (DNS), registries, and/or external devices that may pertain to various network-related functions (e.g., security, management, charging, billing, authentication, authorization, policy enforcement, development, etc.).

According to an exemplary embodiment, at least some of the external devices include logic of the assisted non-terrestrial network selection and access service. For example, the external device may host NTN assistance information, as described herein. According to an exemplary embodiment, the external device may obtain NTN assistance information from a satellite network device (not illustrated), such as a ground station or a server device of satellite network 127 and/or an altitude network device (not illustrated), such as a ground station or a server device of altitude network 129. The NTN assistance information may include different types of information, which may be correlated, that supports usage of non-terrestrial devices by end device 130, as described herein. For example, the NTN assistance information may include location of a NTN device, time period of availability, time period of unavailability, frequency information, and other types of information, as described herein. The external device may update the NTN assistance information based on communication with a non-terrestrial network and end device 130, as described herein.

Core network 120 may include one or multiple networks of one or multiple network types and technologies. Core network 120 may include a complementary network of access network 105. For example, core network 120 may be implemented to include a 5G core network, an evolved packet core (EPC) of an LTE network, an LTE-Advanced (LTE-A) network, and/or an LTE-A Pro network, a future generation core network (e.g., a 5.5G, a 6G, a 7G, or another generation of core network), and/or another type of core network.

Depending on the implementation of core network 120, core network 120 may include diverse types of network devices, such as core devices. For example, the core devices may include a user plane function (UPF), a Non-3GPP Interworking Function (N3IWF), an access and mobility management function (AMF), a session management function (SMF), a unified data management (UDM) device, a unified data repository (UDR), an authentication server function (AUSF), a network slice selection function (NSSF), a network repository function (NRF), a policy control function (PCF), a network data analytics function (NWDAF), a network exposure function (NEF), a service capability exposure function (SCEF), a lifecycle management (LCM) device, a TSCTSF, a mobility management entity (MME), a packet data network gateway (PGW), an enhanced packet data gateway (ePDG), a serving gateway (SGW), a home agent (HA), a General Packet Radio Service (GPRS) support node (GGSN), a home subscriber server (HSS), an authentication, authorization, and accounting (AAA) server, a policy and charging rules function (PCRF), a policy and charging enforcement function (PCEF), and/or a charging system (CS).

The core devices may include a network device that provides a multi-RAT functionality (e.g., 4G and 5G, 5G and 5.5G, 5G and 6G, etc.), such as an SMF with PGW control plane functionality (e.g., SMF+PGW-C), a UPF with PGW user plane functionality (e.g., UPF+PGW-U), and/or other combined nodes (e.g., an HSS with a UDM and/or UDR, an MME with an AMF, etc.). Also, the core devices may include a split core device. For example, the core device may include a session management (SM) PCF, an access management (AM) PCF, a user equipment (UE) PCF, and/or another type of split architecture associated with another core device, as described herein.

Access network 105, application service network 115, and/or core network 120 may include other types of network devices, such as transport devices. The transport devices may include a router, a switch, a relay, and the like.

Non-terrestrial network 125 may include one or multiple networks of one or multiple types and/or technologies that may be aerial, space, and/or altitude based. Satellite network 127 may include one or multiple types of satellite networks of one or multiple technologies. For example, satellite network 127 may include a low earth orbit (LEO) satellite network, a medium earth orbit (MEO) satellite network, a geostationary orbit (GEO) satellite network, a geosynchronous orbit (GSO) satellite network, or another type of satellite network (e.g., future generation, non-LEO, non-MEO, non-GEO, etc.). Satellite network 127 may include a satellite, such as a LEO satellite, a MEO satellite, a GEO satellite, or another type of satellite. Satellite network 127 and the satellites may provide a cellular device-satellite communications service. Satellite network 127 may include a ground station. The ground station may include a station (also known as an earth station, for example) that is configured to communicate with the satellite of satellite network 127. For example, the ground station may transmit data to the satellite, receive data from the satellite, or both. The ground station may provide cellular device-satellite communications service. According to some exemplary embodiments, the access device (e.g., of access network 105) may be integrated with the ground station. According to some exemplary embodiments, the ground station may be configured to communicate directly or indirectly (e.g., via the access device) to end device 130. According to such exemplary embodiments, the ground station may include antennas and communication logic for communication to and from the satellites and other antennas and other communication logic for communication to and from end device 130. The ground station may be co-located with the access device.

Altitude-based network 129 may include one or multiple types of networks of one or multiple technologies that may be non-satellite based. For example, altitude-based network 129 may include a HAPS network, an air-to-ground network, an unmanned aerial device-based network, and/or the like.

End device 130 includes a device that has wireless communication capabilities. End device 130 may have non-wireless communication capabilities (e.g., wired, optical, etc.). End device 130 may be implemented as a mobile device, a portable device, a stationary device (e.g., a non-mobile device and/or a non-portable device), a device operated by a user, or a device not operated by a user. For example, end device 130 may be implemented as a smartphone, a mobile phone, a personal digital assistant, a tablet, a netbook, a wearable device (e.g., a watch, glasses, etc.), a computer, a gaming device, a music device, an IoT device, a drone, a smart device, a fixed wireless device, a router, a sensor, an automated guided vehicle (AGV), an industrial robot, or another type of user equipment (UE). End device 130 may be configured to execute various types of software (e.g., applications, programs, etc.). The number and the types of software may vary among end devices 130. End device 130 may include "edge-aware" and/or "edge-unaware" application service clients. For purposes of description, end device 130 is not considered a network device.

According to an exemplary embodiment, end device 130 includes logic that provides an exemplary embodiment of the assisted non-terrestrial network selection and access service, as described herein. For example, end device 130 may include logic that obtains NTN assistance information, and manages the invocation and execution of non-terrestrial network searches and connection/disconnection with non-terrestrial networks based on NTN assistance information, as described herein. End device 130 may include logic that provides feedback to the external device that hosts the NTN assistance information, as described herein.

Figure 2:
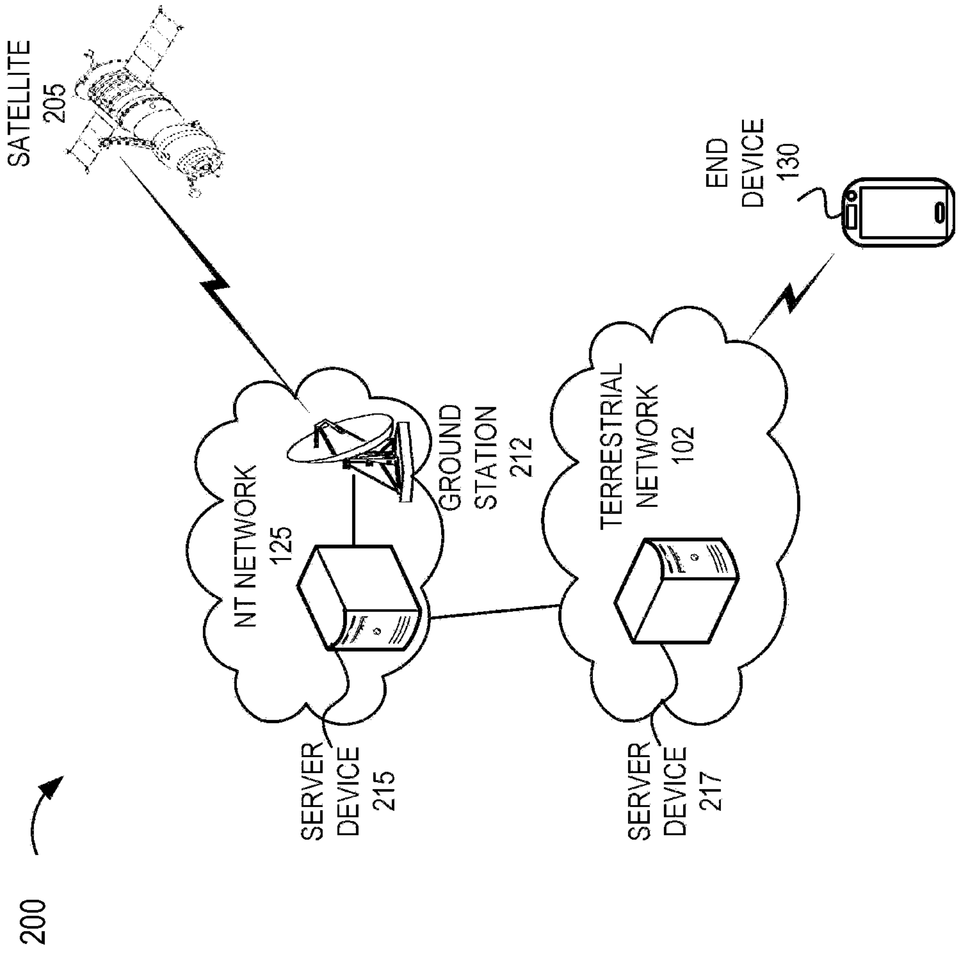
FIG. 2 is a diagram illustrating exemplary components of an exemplary embodiment of the assisted non-terrestrial network selection and access service implemented by an end device.

FIG. 2 is a diagram illustrating another exemplary environment 200 in which an exemplary embodiment of the assisted non-terrestrial network selection and access service. As illustrated, environment 200 includes a satellite, a ground station 212, and a server device 215 of non-terrestrial network 125, a server device 217 of terrestrial network 102, and end device 130.

Satellite 205 may be a GSO, a GEO, a MEO, a LEO, or the like, satellite device or constellation. Satellite network 127 may include a ground station. Ground station 212 may be configured to communicate with satellite 205.

Server device 215 may acquire, store, manage, and update non-terrestrial network information. For example, the non-terrestrial network information may include locations of non-terrestrial network devices, time periods of availability, time periods of unavailability, and satellite frequencies, spectrum, channels, and the like. Server device 215 may obtain non-terrestrial network information from ground station 212 and/or another source device associated with NTN network 125.

Server device 217 may acquire, store, manage, and update NTN assistance information. For example, NTN assistance information may include locations of non-terrestrial network devices, time periods of availability, time periods of unavailability, satellite radio spectrum, and other types of information (e.g., satellite identifiers, decoding information for satellite signal acquisition). For example, the location information may include information that indicates a location, a position, and/or coordinates of an NTN device and/or an NTN constellation. The location information may indicate orbital element sets (e.g., state vectors, Keplerian orbital elements), Earth-Centered Inertial (ECI) position and velocity, latitude/longitudinal coordinates, altitude, azimuth, and/or the like. The location information may also include a terrestrial coverage area. Depending on the NTN device or NTN, the coverage area may be nationwide (e.g., United States), regional (e.g., east coast, west coast, a group of states, or the like), or another type of smaller or larger geographic or geo-fenced area.

Time period availability information may include date and time information that indicates time periods when an NTN device, constellation, or network may be used in relation to a geographic area. For example, time period availability information may indicate a time period when an NTN device may be visible (e.g., line of sight) and/or allow end device 130 to wirelessly connect to the NTN device. The date and time information may include sidereal time, a mean solar time, a local sidereal time (e.g., Greenwich Mean Sidereal (GMST), GST, Universal Time, etc.), Julian Date, calendar date, and so forth.

Time period unavailability information may include date and time information that indicates time periods when an NTN device may not be used in relation to a geographic area. For example, time period unavailability information may indicate a time period when an NTN device may not be visible and/or not allow end device 130 to wirelessly connect to the NTN device.

The radio spectrum information may include information that indicates a radio spectrum, a radio frequency, a radio frequency band, a channel, a carrier frequency, and/or the like, of an NTN device. The NTN assistance information may also correlate other types of information, such as satellite identifiers, decoding information for satellite signal acquisition, and the like.

According to an exemplary embodiment, server device 217 may store NTN assistance information pertaining to satellite 205 and associated satellites of satellite network 127.

Figure 3A:
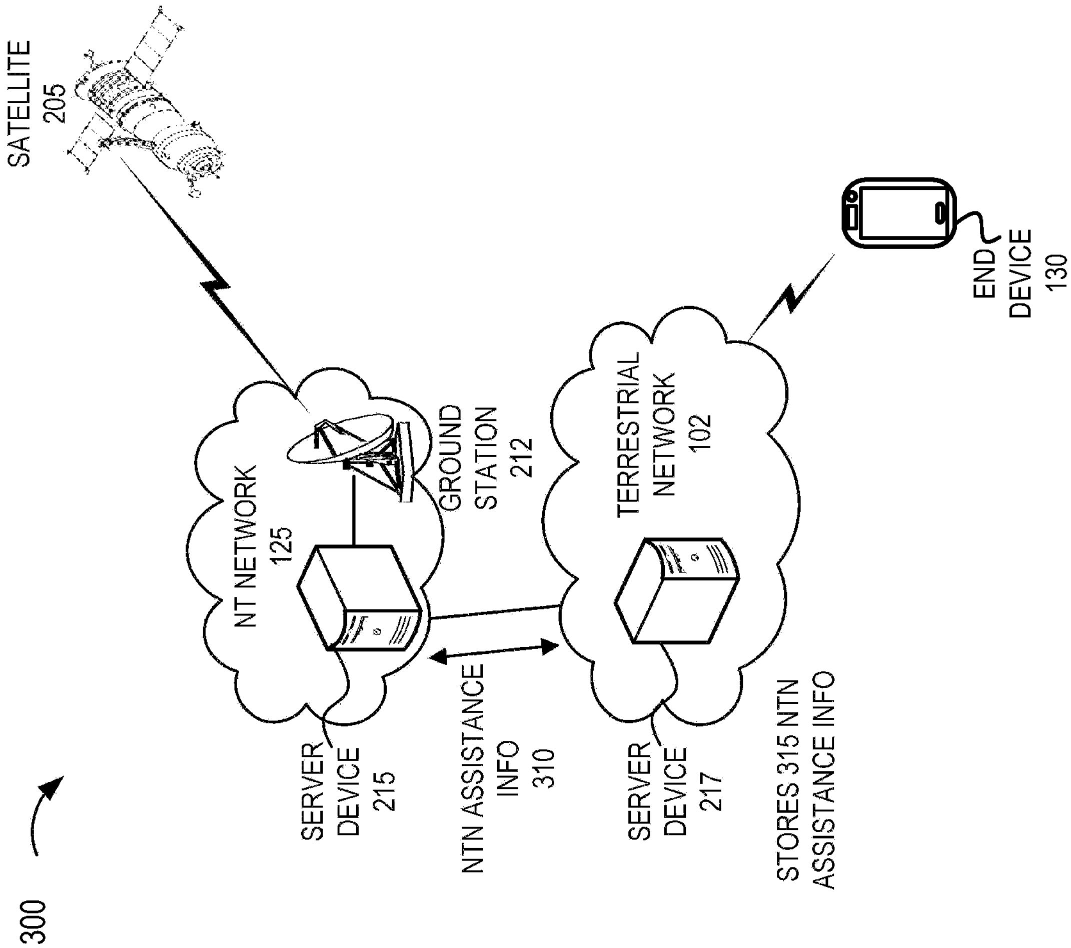
FIGS. 3A-3D are diagrams illustrating an exemplary process of an exemplary embodiment of the assisted non-terrestrial network selection and access service according to an exemplary scenario.

FIGS. 3A-3D are diagrams illustrating an exemplary process 300 of an exemplary embodiment of the assisted non-terrestrial network selection and access service according to an exemplary scenario. Referring to FIG. 3A, server device 215 and server device 217 may communicate with each other in which NTN assistance information 310 is provided. Based on this communication, server device 217 may store 315 NTN assistance information, as described herein.

Figure 3B:
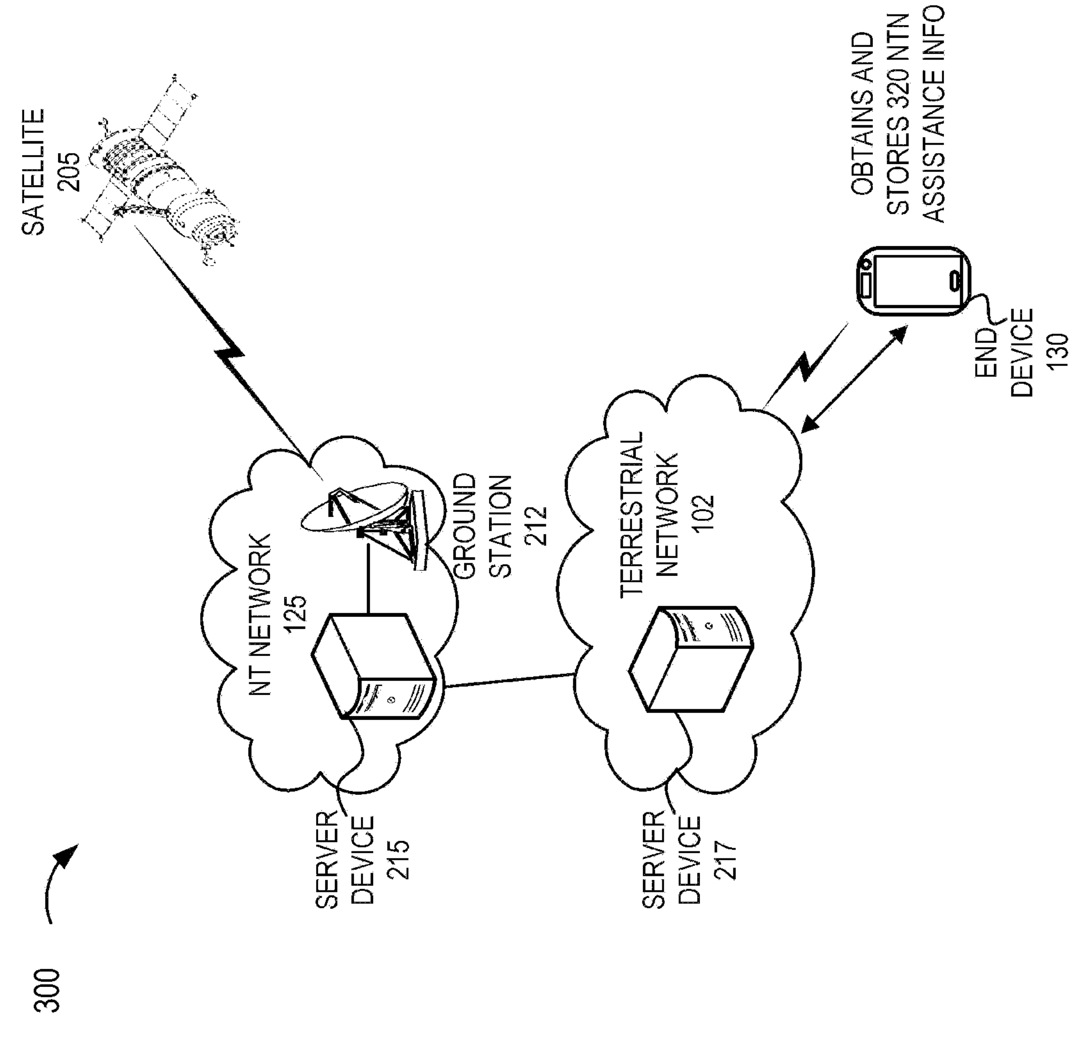

Referring to FIG. 3B, end device 130 may obtain and store 320 the NTN assistance information from server device 217. For example, when end device 130 has connectivity to terrestrial network 102 via access network 105 and associated wireless service (e.g., cellular, WiFi, etc.), end device 130 may connect with server device 217. According to various exemplary embodiments, the communication between end device 130 and server device 217 may include push and/or pull methods of communication.

According to some exemplary embodiments, end device 130 may provide server 217 with its location. Based on the end device 130 location, server 217 may provide NTN assistance information that is of relevance to end device 130 given its location. For example, server 217 may select NTN assistance information that provides coverage within a certain range or geographic area relative to a current location of end device 130.

According to some exemplary embodiments, server 217 may select NTN assistance information based on historical data associated with locations and/or routes traveled by end device 130. In this way, server 217 may predict NTN assistance information of relevance for end device 130. For example, server 217 may include artificial intelligence and/or machine learning (AI/ML) logic that aids in the selection of NTN assistance information for end device 130.

According to some exemplary embodiments, server 217 may select NTN assistance information based on state information associated with a network, such as access network 105. For example, server 217 may obtain information pertaining to power outages, RAN devices (e.g., eNBs, gNBs, or the like) that may not be operational, under repair, scheduled for maintenance, or the like, weather (e.g., storms, etc.), and/or other types of conditions that may negatively impact current or prospective TN wireless service associated with a geographic area.

Figure 3C:
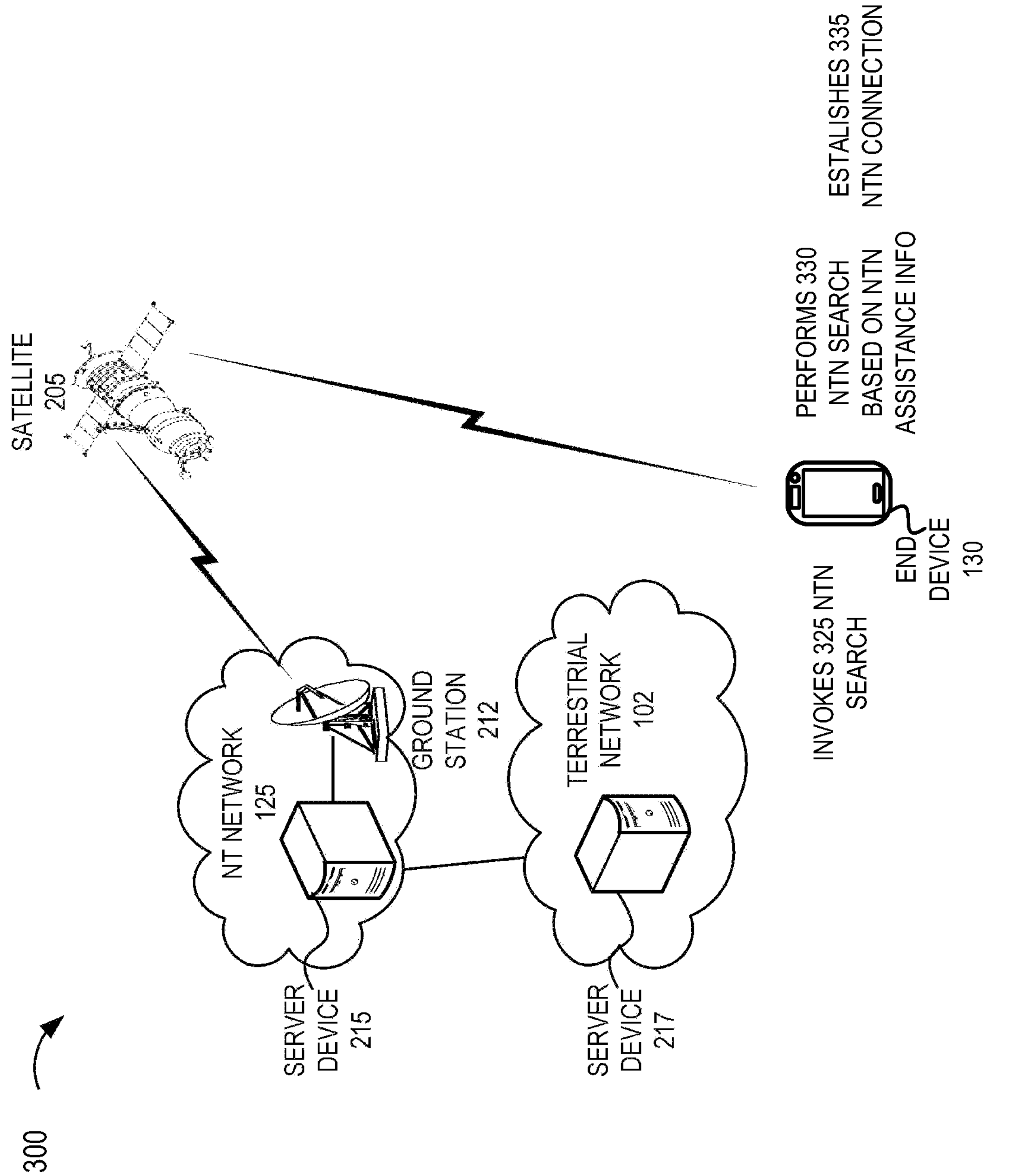

Referring to FIG. 3C, end device 130 may invoke 325 an NTN search. A user (not illustrated) and/or end device 130 may invoke the NTN search based on various triggering events, such as loss of connectivity, repeated failures of TN searches, and the like, as described herein, and stated in U.S. patent application Ser. No. 18/162,096.

As further illustrated, end device 130 may perform 330 an NTN search based on the NTN assistance information. For example, end device 130 may select a radio frequency or band associated with an NTN or NTN device based on the location of end device 130, time availability information, and location information pertaining to the NTN or NTN device. According to some exemplary embodiments, end device 130 may perform an NTN search and scanning procedure in accordance with that described in U.S. patent application Ser. No. 18/162,096. According to some exemplary embodiments, end device 130 may adjust certain parameters of a search and/or scan procedure (e.g., search intervals, total number of searches/scans, retry/backoff parameters and values, etc.) based on the NTN assistance information. For example, for a particular coverage area of relevance to end device 130, an NTN device or NTN may provide ample coverage, sparse coverage, and/or timewise may have transitory coverage. End device 130 may account for these factors when performing the search and scan procedure.

According to some exemplary scenarios, based on the NTN search and scan procedure, end device 130 may be unable to establish an NTN connection with satellite 205. However, according to this exemplary scenario, based on the NTN search and scan procedure, assume that end device 130 may establish 335 an NTN connection with satellite 205.

Figure 3D:
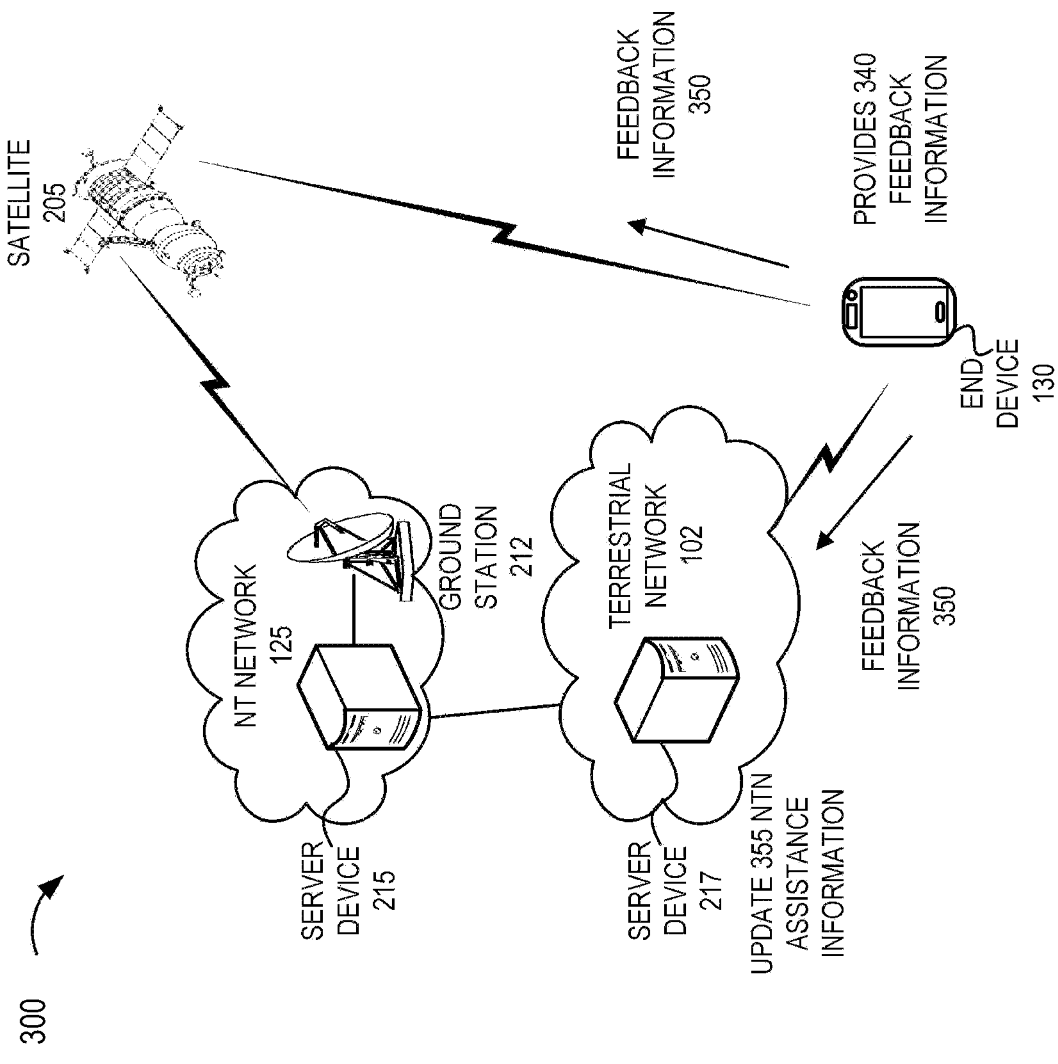

Referring to FIG. 3D, based on the result of the NTN search and NTN connectivity procedures, end device 130 may provide 340 feedback information to server device 217. For example, depending on the outcome of the NTN search, scan, and connection procedure, feedback information 350 may differ. For example, when the outcome is successful, feedback information 350 may indicate that the NTN assistance information is valid, in whole or in part. In this way, server device 217 may receive positive reinforcement feedback regarding the validity of the NTN assistance information provided. According to another exemplary, when the outcome is not successful, feedback information 350 may indicate that the NTN assistance information is invalid or inaccurate, and may indicate that end device 130 was unable to detect an NTN device or NTN, or was unable to establish an NTN connection. According to yet another example, feedback information 350 may indicate a detection and/or connection with an NTN device or NTN in a coverage area not indicated in the NTN assistance information. According to some exemplary embodiments, feedback information 350 may include geographical positions (e.g., longitude, latitude, etc., of end device 130).

Based on receipt of feedback information 350, server device 217 may update 355 the NTN assistance information. For example, based on configured policies regarding the management of the NTN assistance information, server device 217 may invoke remedial measures to ensure the validity or accuracy of the NTN assistance information. Server device 217 may communicate with server device 215 regarding any negative feedback information.

FIGS. 3A-3D illustrate an exemplary process of the assisted non-terrestrial network selection and access service, however, according to other exemplary embodiments, the assisted non-terrestrial network selection and access service may perform additional operations, fewer operations, and/or different operations than those illustrated and described.

Figure 4:
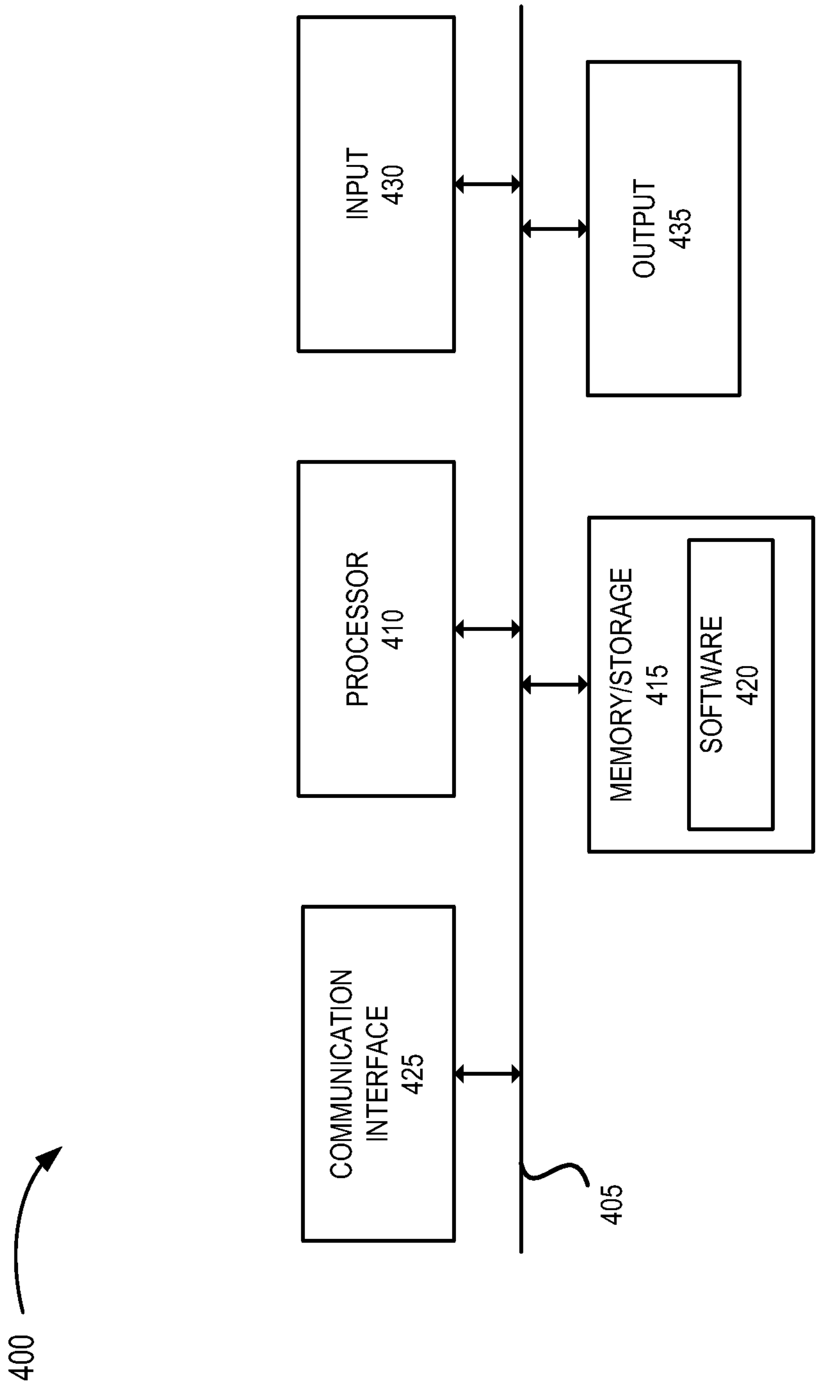
FIG. 4 is a diagram illustrating exemplary components of a device that may correspond to one or more of the devices illustrated and described herein.

FIG. 4 is a diagram illustrating exemplary components of a device 400 that may be included in one or more of the devices described herein. For example, device 400 may correspond to end device 130, a network device (e.g., access device, external device, core device, etc.), server device 215, server device 217, and/or other types of devices, as described herein. As illustrated in FIG. 4, device 400 includes a bus 405, a processor 410, a memory/storage 415 that stores software 420, a communication interface 425, an input 430, and an output 435. According to other embodiments, device 400 may include fewer components, additional components, different components, and/or a different arrangement of components than those illustrated in FIG. 4 and described herein.

Bus 405 includes a path that permits communication among the components of device 400. For example, bus 405 may include a system bus, an address bus, a data bus, and/or a control bus. Bus 405 may also include bus drivers, bus arbiters, bus interfaces, clocks, and so forth.

Processor 410 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 410 may be implemented as hardware (e.g., a microprocessor, etc.), a combination of hardware and software (e.g., a SoC, an ASIC, etc.), may include one or multiple memories (e.g., cache, etc.), etc.

Processor 410 may control the overall operation, or a portion of operation(s) performed by device 400. Processor 410 may perform one or multiple operations based on an operating system and/or various applications or computer programs (e.g., software 420). Processor 410 may access instructions from memory/storage 415, from other components of device 400, and/or from a source external to device 400 (e.g., a network, another device, etc.). Processor 410 may perform an operation and/or a process based on various techniques including, for example, multithreading, parallel processing, pipelining, interleaving, learning, model-based, etc.

Memory/storage 415 includes one or multiple memories and/or one or multiple other types of storage mediums. For example, memory/storage 415 may include one or multiple types of memories, such as, a random access memory (RAM), a dynamic RAM (DRAM), a static RAM (SRAM), a cache, a read only memory (ROM), a programmable ROM (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 415 may include a hard disk (e.g., a magnetic disk, an optical disk, a magneto-optic disk, a solid-state component, etc.), a Micro-Electromechanical System (MEMS)-based storage medium, and/or a nanotechnology-based storage medium.

Memory/storage 415 may be external to and/or removable from device 400, such as, for example, a Universal Serial Bus (USB) memory stick, a dongle, a hard disk, mass storage, off-line storage, or some other type of storing medium. Memory/storage 415 may store data, software, and/or instructions related to the operation of device 400.

Software 420 includes an application or a program that provides a function and/or a process. As an example, with reference to end device 130, software 420 may include an application that, when executed by processor 410, provides a function and/or a process of assisted non-terrestrial network selection and access service, as described herein. As another example, with reference to server device 217, software 420 may include an application that, when executed by processor 410, provides a function and/or a process of assisted non-terrestrial network selection and access service, as described herein. Software 420 may also include firmware, middleware, microcode, hardware description language (HDL), and/or another form of instruction. Software 420 may also be virtualized. Software 420 may further include an operating system (OS) (e.g., Windows, Linux, Android, proprietary, etc.).

Communication interface 425 permits device 400 to communicate with other devices, networks, systems, and/or the like. Communication interface 425 includes one or multiple wireless interfaces, optical interfaces, and/or wired interfaces. For example, communication interface 425 may include one or multiple transmitters and receivers, or transceivers. Communication interface 425 may operate according to a protocol stack and a communication standard. Communication interface 425 may include a modem.

Input 430 permits an input into device 400. For example, input 430 may include a keyboard, a mouse, a display, a touchscreen, a touchless screen, a button, a switch, an input port, speech recognition logic, and/or some other type of visual, auditory, tactile, affective, olfactory, etc., input component. Output 435 permits an output from device 400. For example, output 435 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, PaaS, etc.). Device 400 may be implemented in the same manner. For example, device 400 may be instantiated, created, deleted, or some other operational state during its life-cycle (e.g., refreshed, paused, suspended, rebooting, or another type of state or status), using well-known virtualization technologies. For example, a network device and/or end device 130, as described herein, may be a virtualized device.

Device 400 may be configured to perform a process and/or a function, as described herein, in response to processor 410 executing software 420 stored by memory/storage 415. By way of example, instructions may be read into memory/storage 415 from another memory/storage 415 (not shown) or read from another device (not shown) via communication interface 425. The instructions stored by memory/storage 415 cause processor 410 to perform a function or a process described herein. Alternatively, for example, according to other implementations, device 400 may be configured to perform a function or a process described herein based on the execution of hardware (processor 410, etc.).

Figure 5:
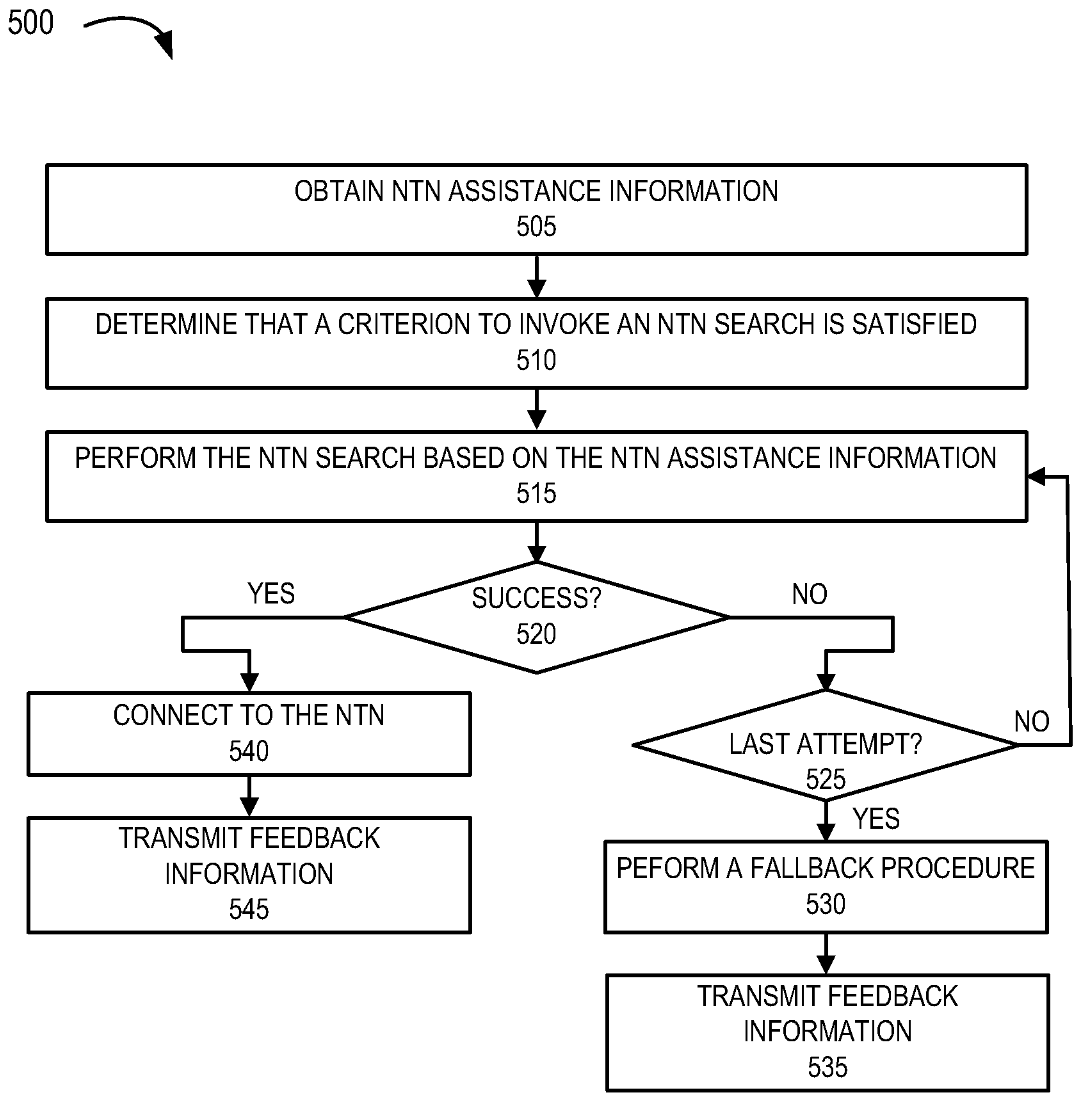
FIG. 5 is a flow diagram illustrating an exemplary process of an exemplary embodiment of the assisted non-terrestrial network selection and access service.

FIG. 5 is a flow diagram illustrating an exemplary process 500 of an exemplary embodiment of the assisted non-terrestrial network selection and access service. According to an exemplary embodiment, end device 130 may perform process 500. According to an exemplary implementation, processor 410 executes software 420 to perform a step of process 500, as described herein. Alternatively, a step may be performed by execution of only hardware.

In block 505, end device 130 may obtain NTN assistance information. For example, end device 130 may obtain the NTN assistance information from server device 217 or another type of network device. End device 130 may obtain the NTN assistance information when end device 130 is connected to a TN, for example. The NTN assistance information may include location information, time period of availability information, time period of unavailability information, satellite radio spectrum information, and other types of information, as described herein. The NTN assistance information may pertain to one or multiple NTNs and/or NTN devices.

In block 510, end device 130 may determine that a criterion to invoke an NTN search is satisfied For example, the criterion may include when terrestrial network service is not available (e.g., no scan results, etc.), when the end device may be barred from terrestrial network connectivity, when attempts for terrestrial network connectivity result in repeated failures (e.g., repeated failures may be defined), or the user may trigger a search or scan for a non-terrestrial network when any of the above-mentioned situations exists. End device 130 may make this determination based on a result of a terrestrial network search, a result of an attempt to connect to a terrestrial network, or a result of performing another type of procedure that would enable end device 130 to determine that the criterion to invoke the NTN search is satisfied.

In block 515, end device 130 may perform an NTN search based on at least the NTN assistance information. For example, end device 130 may perform a scan relative to scanning groups and associated scanning intervals and number of attempts, as described herein. The NTN search may include other parameters relating to how the NTN search is performed, such as a location parameter, a current time parameter, historical NTN scanning or searching information, and/or other configurable parameters, as described herein.

In block 520, end device 130 may determine whether the NTN search is successful. When end device 130 determines that the NTN search is not successful (block 520—NO), end device 130 may determine whether the scan is the last permissible scan according to the scanning parameters (block 525). When end device 130 determines that the scan is not the last permissible scan (block 525—NO), end device 130 may continue to perform the NTN search and return to block 515. When end device 130 determines that the scan is the last permissible scan (block 525—YES), end device 130 may perform a fallback procedure (block 530). For example, end device 130 may perform a TN search. Alternatively, end device 130 may wait a back-off time period before initiating the TN search or another NTN search. Additionally, when end device 130 establishes connectivity to a network (e.g., a TN or an NTN), end device 130 may transmit feedback information (535). For example, end device 130 may transmit feedback information to server device 217. The feedback information may indicate the unsuccessful attempts to detect an NTN device or NTN during the search or scan procedure, the inability to connect to the NTN device or NTN, and so forth, as described herein. End device 130 may transmit the feedback information in response to a successful connection with a terrestrial network and/or non-terrestrial network, which may occur later in time.

When end device 130 may determine that the NTN search is successful (block 520—YES), end device 130 may establish a connection with the NTN (block 540). In response, end device 130 may transmit feedback information (block 545). For example, end device 130 may transmit feedback information to server device 217. The feedback information may indicate the validity of the NTN assistance information used by end device 130. At some later time, although not depicted, end device 130 may terminate the NTN connection and resume scanning for a TN.

FIG. 5 illustrates an exemplary process of the assisted non-terrestrial network selection and access service, however, according to other exemplary embodiments, the assisted non-terrestrial network selection and access service may perform additional operations, fewer operations, and/or different operations than those illustrated and described. For example, end device 130 may transmit feedback information that may indicate an adjustment to the NTN assistance information to server device 217 or the like. For example, as previously described, end device 130 may detect an NTN in an area, radio spectrum, and/or time period differing from the NTN assistance information.

As set forth in this description and illustrated by the drawings, reference is made to "an exemplary embodiment," "exemplary embodiments," "an embodiment," "embodiments," etc., which may include a particular feature, structure, or characteristic in connection with an embodiment(s). However, the use of the phrase or term "an embodiment," "embodiments," etc., in various places in the description does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while a series of blocks has been described regarding the process illustrated in FIG. 5, the order of the blocks may be modified according to other embodiments. Further, non-dependent blocks may be performed in parallel.

Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 410, etc.), or a combination of hardware and software (e.g., software 420).

Embodiments have been described without reference to the specific software code because the software code can be designed to implement the embodiments based on the description herein and commercially available software design environments and/or languages. For example, diverse types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 410) of a device. A non-transitory storage medium includes one or more of the storage mediums described in relation to memory/storage 415. The non-transitory computer-readable storage medium may be implemented in a centralized, distributed, or logical division that may include a single physical memory device or multiple physical memory devices spread across one or multiple network devices.

To the extent the aforementioned embodiments collect, store, or employ personal information of individuals, it should be understood that such information shall be collected, stored, and used in accordance with all applicable laws concerning protection of personal information. Additionally, the collection, storage and use of such information can be subject to the consent of the individual to such activity, for example, through well known "opt-in" or "opt-out" processes as can be appropriate for the situation and type of information. Collection, storage, and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known are expressly incorporated herein by reference and are intended to be encompassed by the claims.

What is claimed is:

1. A method comprising:

obtaining, by an end device from a network device of a terrestrial network, non-terrestrial network assistance information including location and a radio frequency or band of a non-terrestrial network device for signal acquisition associated with a non-terrestrial network;

determining, by the end device, that a criterion to invoke a search of the non-terrestrial network is satisfied;

performing, by the end device, the search based on the non-terrestrial network assistance information; and transmitting, by the end device after the performing, feedback information pertaining to the search and the non-terrestrial network assistance information to the network device.

2. The method of claim 1, further comprising:

establishing, by the end device based on the performing, a connection with the non-terrestrial network.

3. The method of claim 2, wherein the feedback information indicates that at least a portion of the non-terrestrial network assistance information is valid.

4. The method of claim 1, further comprising:

not establishing, by the end device based on the performing, a connection with the non-terrestrial network.

5. The method of claim 4, wherein the feedback information indicates that at least a portion of the non-terrestrial network assistance information is not valid.

6. The method of claim 1, wherein the criterion is satisfied based on a failure of the end device to connect to one or more candidate terrestrial networks.

7. The method of claim 1, further comprising:

providing, by the end device to the network device before the obtaining, a location of the end device.

8. The method of claim 1, wherein the non-terrestrial network assistance information includes a time period of availability including a date and time relative to a geographic area during which the end device can connect to the non-terrestrial network device, a time period of unavailability including a date and time relative to the geographic area during which the end device cannot connect to the non-terrestrial network device, and a satellite identifier of the non-terrestrial network device.

9. An end device comprising:

a processor that is configured to:

obtain, from a network device of a terrestrial network, non-terrestrial network assistance information including location and a radio frequency or band of a non-terrestrial network device for signal acquisition associated with a non-terrestrial network;

determine that a criterion to invoke a search of the non-terrestrial network is satisfied;

perform the search based on the non-terrestrial network assistance information; and transmit, after the performing the search, feedback information pertaining to the search and the non-terrestrial network assistance information to the network device.

10. The end device of claim 9, wherein the processor is further configured to:

establish, based on the performance of the search, a connection with the non-terrestrial network.

11. The end device of claim 10, wherein the feedback information indicates that at least a portion of the non-terrestrial network assistance information is valid.

12. The end device of claim 9, wherein the processor is further configured to:

not establish, based on the performance of the search, a connection with the non-terrestrial network.

13. The end device of claim 12, wherein the feedback information indicates that at least a portion of the non-terrestrial network assistance information is not valid.

14. The end device of claim 9, wherein the criterion is satisfied based on a failure of the end device to connect to one or more candidate terrestrial networks.

15. The end device of claim 9, wherein the processor is further configured to:

provide to the network device, before the obtainment of the non-terrestrial assistance information, a location of the end device.

16. The end device of claim 9, wherein the non-terrestrial network assistance information includes a time period of availability including a date and time relative to a geographic area during which the end device can connect to the non-terrestrial network device, a time period of unavailability including a date and time relative to the geographic area during which the end device cannot connect to the non-terrestrial network device, and a satellite identifier of the non-terrestrial network device.

17. A non-transitory computer-readable storage medium storing instructions executable by a processor of a device, wherein the instructions are configured to:

obtain, from a network device of a terrestrial network, non-terrestrial network assistance information including location and a radio frequency or band of a non-terrestrial network device for signal acquisition associated with a non-terrestrial network;

determine that a criterion to invoke a search of the non-terrestrial network is satisfied;

perform the search based on the non-terrestrial network assistance information; and transmit, after the performing the search, feedback information pertaining to the search and the non-terrestrial network assistance information to the network device.

18. The non-transitory computer-readable storage medium of claim 17, wherein the instructions are further configured to:

not establish, based on the performance of the search, a connection with the non-terrestrial network, wherein the feedback information indicates that at least a portion of the non-terrestrial network assistance information is not valid.

19. The non-transitory computer-readable storage medium of claim 17, wherein the instructions are further configured to:

establish, based on the performance of the search, a connection with the non-terrestrial network, wherein the feedback information indicates that at least a portion of the non-terrestrial network assistance information is valid.

20. The non-transitory computer-readable storage medium of claim 17, wherein the non-terrestrial network assistance information includes to a time period of availability including a date and time relative to a geographic area during which the device can connect to the non-terrestrial network device, a time period of unavailability including a date and time relative to the geographic area during which the device cannot connect to the non-terrestrial network device, and a satellite identifier of the non-terrestrial network device.

* * * * *